US009143517B2

(12) United States Patent
Horne et al.

(10) Patent No.: US 9,143,517 B2
(45) Date of Patent: Sep. 22, 2015

(54) THREAT EXCHANGE INFORMATION PROTECTION

(71) Applicant: Hewlett-Packard Development Company, L.P., Houston, TX (US)

(72) Inventors: William G. Horne, Lawrenceville, NJ (US); Daniel L. Moor, Midland, MI (US); Richard D. Austin, Marietta, GA (US); Tomas Sander, New York, NY (US); Prasad V. Rao, Metuchen, NJ (US); Sandeep N. Bhatt, Madison, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 13/754,951

(22) Filed: Jan. 31, 2013

(65) Prior Publication Data
US 2014/0215607 A1    Jul. 31, 2014

(51) Int. Cl.
*H04L 29/06*    (2006.01)
*G06F 21/62*    (2013.01)

(52) U.S. Cl.
CPC ............ *H04L 63/14* (2013.01); *G06F 21/6245* (2013.01)

(58) Field of Classification Search
CPC . H04L 63/14; H04L 63/1408; H04L 63/1416; H04L 63/1433; H04L 63/1425; H04L 63/145
USPC ..................................................... 726/22–25
See application file for complete search history.

(56) References Cited

U.S. PATENT DOCUMENTS

| | | | | |
|---|---|---|---|---|
| 5,062,147 A | * | 10/1991 | Pickett et al. | 714/46 |
| 5,237,677 A | * | 8/1993 | Hirosawa et al. | 714/57 |
| 5,414,833 A | * | 5/1995 | Hershey et al. | 726/22 |
| 5,440,723 A | * | 8/1995 | Arnold et al. | 714/2 |
| 5,452,442 A | * | 9/1995 | Kephart | 714/38.1 |
| 5,491,791 A | * | 2/1996 | Glowny et al. | 714/37 |
| 5,511,163 A | * | 4/1996 | Lerche et al. | 714/28 |
| 6,088,804 A | * | 7/2000 | Hill et al. | 726/25 |
| 6,807,569 B1 | | 10/2004 | Bhimani et al. | |
| 7,461,036 B2 | | 12/2008 | Genty et al. | |
| 7,594,224 B2 | | 9/2009 | Patrick et al. | |
| 7,779,119 B2 | | 8/2010 | Ginter et al. | |
| 7,784,097 B1 | | 8/2010 | Stolfo et al. | |
| 7,841,008 B1 | | 11/2010 | Cole et al. | |
| 7,953,846 B1 | | 5/2011 | Amoroso et al. | |
| 7,996,888 B2 | | 8/2011 | Asunmaa et al. | |

(Continued)

OTHER PUBLICATIONS

Yang et al. ( "A Framework for Large-scale Distributed Intrusion Detection System (LDIDS) Draft-Yang-ldids-framework-00.txt", Beijing University of Posts and Telecom, Jun. 2003).*

(Continued)

*Primary Examiner* — Kambiz Zand
*Assistant Examiner* — Tongoc Tran
(74) *Attorney, Agent, or Firm* — Brooks, Cameron & Huebsch

(57) ABSTRACT

Threat exchange information protection can include receiving security information from a number of participants of a threat exchange community, wherein a portion of the received security information is encoded with pseudonyms by each of the number of participants, analyzing the security information collectively from the number of participants, wherein the portion of the received security information remains encoded, and sending analysis results to each of the number of participants, wherein the analysis results include information relating to the portion.

15 Claims, 3 Drawing Sheets

(56) References Cited

U.S. PATENT DOCUMENTS

| | | | |
|---|---|---|---|
| 8,065,725 B2 | 11/2011 | Zheng et al. | |
| 8,204,813 B2 | 6/2012 | Merkoulovitch et al. | |
| 8,286,239 B1 | 10/2012 | Sutton | |
| 8,327,442 B2 | 12/2012 | Herz et al. | |
| 2002/0174364 A1* | 11/2002 | Nordman et al. | 713/201 |
| 2004/0215972 A1* | 10/2004 | Sung et al. | 713/201 |
| 2005/0102534 A1 | 5/2005 | Wong | |
| 2007/0011743 A1* | 1/2007 | Krishnamurthy | 726/23 |
| 2007/0169171 A1 | 7/2007 | Kumar et al. | |
| 2008/0172382 A1 | 7/2008 | Prettejohn | |
| 2009/0144102 A1* | 6/2009 | Lopez | 705/7 |
| 2009/0282010 A1* | 11/2009 | Vasudevan et al. | 707/4 |
| 2010/0299292 A1 | 11/2010 | Collazo | |
| 2011/0153383 A1 | 6/2011 | Bhattacharjya et al. | |
| 2011/0161069 A1 | 6/2011 | Staffel | |
| 2011/0173699 A1 | 7/2011 | Figlin et al. | |
| 2011/0239270 A1 | 9/2011 | Sovio et al. | |
| 2011/0302653 A1* | 12/2011 | Frantz et al. | 726/22 |
| 2012/0072983 A1 | 3/2012 | McCusker et al. | |
| 2012/0233698 A1 | 9/2012 | Watters et al. | |
| 2012/0246730 A1 | 9/2012 | Raad | |

OTHER PUBLICATIONS

Evans, et al., "Context-derived Pseudonyms for Protection of Privacy in Transport Middleware and Applications", Proceedings of the Fifth IEEE International Conference on Pervasive Computing and Communications Workshops (PERCOMW'07), Mar. 2007, 6 pages.

Fiat, et al., "Broadcast Encryption", Advances in Cryptology (CRYPTO'93), Lecture Notes in Computer Science, vol. 773, Jul. 1994, 13 pages.

Neubauer., "An Evaluation of Technologies for the Pseudonymization of Medical Data", In Computer and Information Science, SCI 208, Apr. 2009, pp. 47-60.

Sweeney, Latanya., "Uniqueness of simple demographics in the U.S. population", (Shorter Version: "Simple Demographics Often Identify People Uniquely") LIDAPWP4, Carnegie Mellon University, Laboratory for International Data Privacy, Pittsburgh, PA, May 2000, 34 pages.

Ando, et al., "Parallel analysis for lightweight network incident detection using nonlinear adaptive systems", Proceedings of IFIP International Conference on Network and Parallel Computing, Sep. 18-21, 2007, 7 pages.

Jain, et al., "Data Clustering: A Review", ACM Computing Surveys, vol. 31, No. 3, Sep. 1999, pp. 264-323.

Julisch, K., "Mining Alarm Clusters to Improve Alarm Handling Efficiency", Proceedings of the 17th Annual Computer Security Applications Conference (ACSAC01), Dec. 10-14, 2001, 10 pages.

Lee, W., "A Data Mining Framework for Constructing Features and Models for Intrusion Detection Systems", PhD Thesis, Columbia University, 1999, 193 pages.

Katti, et al., "Collaborating Against Common Enemies", ACM Internet Measurement Conference, Aug. 2005, 23 pages.

Punj, et al., "Cluster Analysis in Marketing Research: Review and Suggestions for Application", Journal of Research, vol. 20, No. 2, May 1983, pp. 134-148.

Porras, et al., "A Mission-Impact-Based Approach to INFOSEC Alarm Correlation", Proc. Int'l Symp. The Recent Advances in Intrusion Detection, Oct. 2002, 19 pages.

Vaarandi, Risto., "A data clustering algorithm for mining patterns from event logs", 3rd IEEE Workshop on IP Operations and Management, 2003, (IPOM 2003), Oct. 1-3, 2003, 8 pages.

Wedel, et al., "Market Segmentation: Conceptual and Methodological Foundations", Journal of Targeting Measurement and Analysis for Marketing, Aug. 2000, Kluwer Academic Publishers, vol. 9, Issue: 1, 2 pages.

Boggs, et al., "Cross-domain Collaborative Anomaly Detection: So Far Yet So Close", 12th International Symposium on Recent Advances in Intrusion Detection, RAID 2009, Saint-Malo, Brittany, France, Sep. 23-25, 2009, 20 pages.

Zhang, et al., "Highly Predictive Blacklisting", 17th USENIX Security Symposium, San Jose, CA, USA, Jul. 28-Aug. 1, 2008, pp. 107-122.

Sundaramurthy, et al., "Examining Intrusion Prevention System Events from Worldwide Networks", 19th ACM Pre-Conference on Building Analysis Datasets and Gathering Experience Returns for Security (BADGERS'12), Raleigh, NC, USA, Oct. 15, 2012, 8 pages.

Abdulrahman, "Investigating the Technological and Practical Levels of Maturity of the Industry to Implement Web Services Security", Master's Thesis for: Department of Numerical Analysis and Computer Science, Stockholm Royal Institute of Technology, Oct. 2005, 92 pages.

Ben-Shalom, et al., "Granular Trust Model Improves Enterprise Security", www.intel.com/IT, Intel Corporation, Nov. 2012, 8 pages.

Zhou, et al., "Modeling Network Intrusion Detection Alerts for Correlation", ACM Transactions on Information and System Security, vol. 10, No. 1, Article 4, Feb. 2007, 31 pages.

Unknown., "Monitoring, Analysis, and Correlation" Accessed via: http http://www.cisco.com/en/US/docs/solutions/Enterprise/Security/SAFE_RG/chap10.html, Dec. 2012, 26 pages.

Unknown., "Real-Time Threat Management—Securing Your Journey to the Cloud", Trend Micro, Jun. 2011, 2 pages.

Kaplan, Dan., "Sharing the pie: Threat Collaboration", Accessed via: http://www.scmagazine.com/sharing-the-pie-threat-collaboration/article/250421/, SC Magazine, Aug. 1, 2012, 3 pages.

Unknown., "AlienVault Open Threat Exchange" Dec. 2012, 2 pages.

Phillips, et al., "Information Sharing and Security in Dynamic Coalitions," Jun. 2002, 16 pages.

Fokoue, et al., "A Decision Support System for Secure Information Sharing," The 14th ACM Symposium on Access Control Models and Technologies SACMAT'09, Jun. 3-5, 2009, Stresa, Italy, 10 pages.

* cited by examiner

THREAT EXCHANGE INFORMATION PROTECTION

BACKGROUND

Entities can use the Internet to create networks. Such networks can be used to connect people, provide services, and/or organize information, among other activities associated with an entity. The network can include a plurality of resources connected by communication links. Due to the distributed nature of the network, resources on the network can be susceptible to security attacks. A security attack can include, for example, an attempt to destroy, alert, disable, steal, and/or gain unauthorized access to use of an asset (e.g., a resource, confidential information).

DETAILED DESCRIPTION

Figure 1:
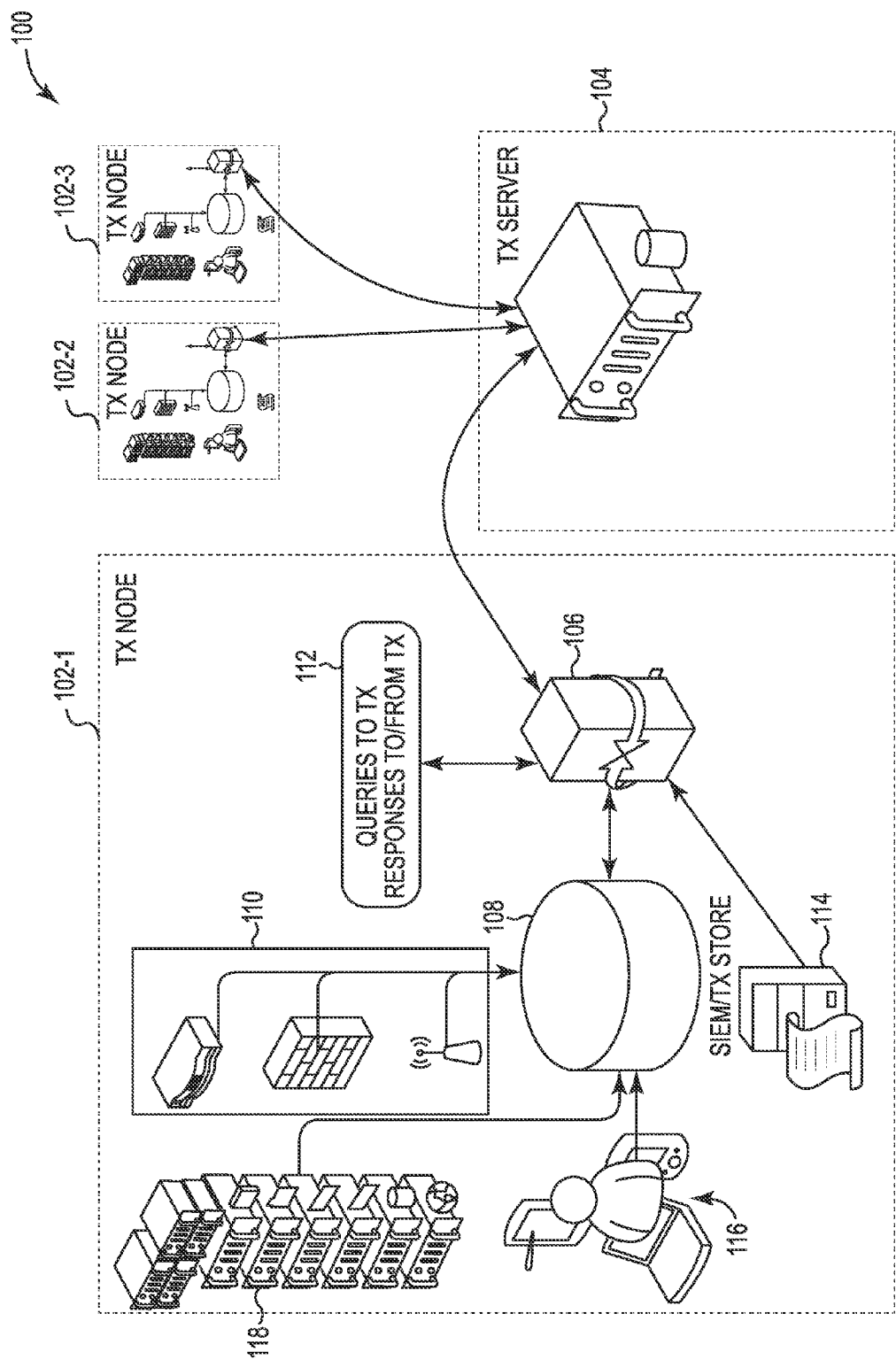
FIG. 1 illustrates an example of an environment for threat exchange information protection according to the present disclosure.

Information (e.g., data) confidentiality can be a concern for entities that participate in an exchange of threat and security related information (e.g., threat exchange community, etc.). A decision whether information should be shared or not may depend on static properties of the information, such as, for example, whether the information contains Personally Identifiable Information (PII). The properties of the information can also include specifics (e.g., manufacturer name, serial number, type of device, etc.) of a participant's information technology (IT) infrastructure. An IT infrastructure can include hardware such as network equipment (e.g., routers, switches, gateways, bridges, or other networking equipment), computer servers, personal computers (e.g., desktop computers, notebook computers, tablet devices, smartphones, and/or other personal computing devices), and/or other computing hardware; software (e.g., instructions that when executed at hardware implement applications, services, or other resources); and/or a combination of hardware and software. For example, a participant may not want specifics of a server to be provided to the threat exchange community. In this example, the participant can encode a pseudonym in place of a real name for the server prior to sending the information relating to the server to the threat exchange community.

Utilizing pseudonym encoding can enable participants to protect the specifics of the participant's IT infrastructure when sharing security information (e.g., security threats, security attacks, information relating to network security, etc.). In addition, utilizing pseudonym encoding can enable the exchange community and/or a third party to determine basic functions of a particular feature. For example, if the pseudonym for a particular server is "Server 1", the exchange community can determine that "Server 1" performs functions similar to a computing server. In this same example, there can be security information relating to "Server 1".

Utilizing pseudonym encoding can encourage potential participants to join a security threat exchange community. For example, potential participants may want to encode specific information relating to their IT infrastructure to protect the information from potential competitors within the threat exchange community. Utilizing pseudonym encoding can enable participants to encode the specific information while providing the threat exchange community with enough information to analyze the received threat information from each participant.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As used herein, "a" or "a number of" something can refer to one or more such things. For example, "a number of articles" can refer to one or more articles.

FIG. 1 illustrates an example of an environment 100 for threat exchange information protection according to the present disclosure. The environment 100 can include a threat exchange (TX) server 104. The threat exchange server 104 can receive threat information from a number of entities (e.g., entity 102-1, entity 102-2, entity 102-3, etc.) of a threat exchange community. A portion of the received threat information can be encoded with pseudonyms by each of the number of participants within each of the number of entities prior to sending the threat information to the threat exchange server 104.

Each of the number of entities can include a number of participants that are grouped and/or separated based on a type (e.g., business type, network type, functionality type, etc.). For example, entity 102-1 can include a number of participants (e.g., participants 116, etc.) that all perform banking functions (e.g., financial institutions, particular business types, etc.). In another example, entity 102-2 can include a number of participants that perform legal functions (e.g., lawyers, etc.). In these examples, the entities can each be exposed to similar security threats (e.g., similar security attacks, similar network malware, similar employee behaviors, etc.).

Grouping and/or separating the number of entities based on a type can enable the threat exchange server 104 to categorize the threat information based on the type of the number of participants. Similar types can be subject to similar threat events and therefore categorizing the threat events based on the type can enable the threat exchange server 104 to detect threat events that are harmful to some or all participants within the entity.

Entity 102-1 can include a number of features. The features can include a threat exchange store 108. The threat exchange store 108 can receive information from the number of participants 116 utilizing a number of databases 118 and/or a number of communication pathways 110. The threat exchange store 108 can communicate with a threat exchange query engine 106.

The threat exchange query engine 106 can communicate with a threat exchange server 104 and/or a policy database 114. The threat exchange query engine 106 can generate queries and/or receive responses 112 with the threat exchange server 104. The threat exchange query engine 106 can receive client sharing policies from the policy database 114. The client sharing policies within the policy database 114 can include a quantity and/or a quality of information to share with the threat exchange server 104. For example, the client sharing policies can include a pseudonym table to implement a number of pseudonyms in place of real names of information that a particular client wishes to keep from the threat exchange server 104.

Figure 2:
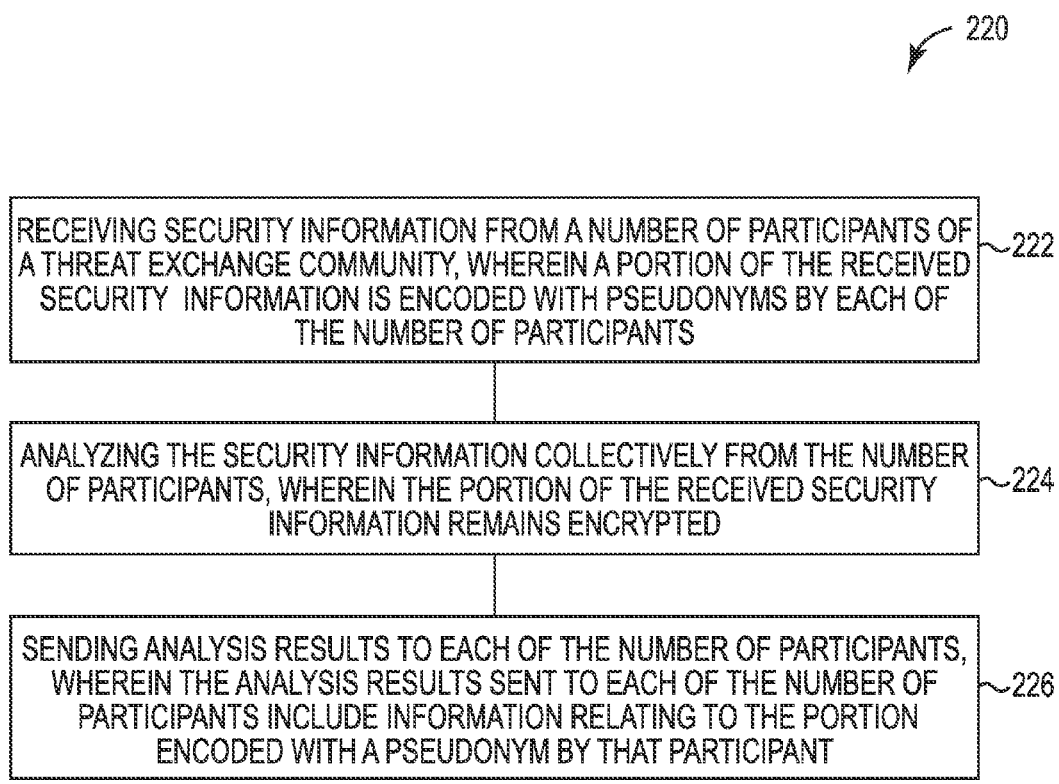
FIG. 2 illustrates a flow table of an example of a method for threat exchange information protection according to the present disclosure.

FIG. 2 illustrates a flow table of an example of a method 220 for threat exchange information protection according to the present disclosure. The method 220 can be performed in an environment similar to the environment 100 described within FIG. 1.

At box 222 the method 220 can include receiving, via a communication link, security information from a number of participants of a threat exchange community, wherein a portion of the received security information is encoded with pseudonyms by each of the number of participants. Receiving security information from the number of participants can include utilizing a threat exchange server (e.g., threat exchange server as referenced in FIG. 1 at 104, etc.) to receive security information from a number of participants within a threat exchange community. The security information can include, but is not limited to: security event data, security threats, security attacks, network topology, software systems, and/or employee behaviors.

The security event data within the security information can correspond to security related information (e.g., security threat event, suspicious event, security threat, virus, security attacks, etc.) and can include a number of common fields. For example, the number of common fields can include: IP addresses, host names, software identifiers, patch levels, etc. The security event data can correspond to a particular feature of a participant's IT infrastructure (e.g. a particular server, etc.).

The portion of the received threat information that is encoded with pseudonyms can include features of the participant's IT infrastructure. A participant may desire to protect specific information relating to the participant's IT infrastructure. For example, the participant may desire to protect the make and/or model of particular hardware within the participant's IT infrastructure by replacing the name of the particular hardware with a pseudonym prior to sending the threat information to the threat exchange community.

The pseudonym can designate a particular feature of the participant's security information. For example, the pseudonym can be a generic term for the particular feature that can identify a type of security information (e.g., IP address, etc.). In another example, the pseudonym can identify a generic hardware feature within the participant's IT infrastructure. For example, the pseudonym can be a generic term such as "Personal Computer 1" to encode a particular employee's computer within the participant's IT infrastructure.

A pseudonym can be utilized to encode any portion of the security information and/or any portion of the common fields within the security event data. For example, a pseudonym such as "IP address 1" can be used to encode a specific IP address within a participant's IT infrastructure prior to sending threat information relating to the specific IP address. In this example, "IP address 1" designates that the information relates to a specific IP address without releasing the specific IP address to the threat exchange community. In another example, a pseudonym such as "Computer 1" can be used to encode a specific employee computer prior to sending threat information relating to the employee's computing behavior on the specific employee computer to the threat exchange community.

A pseudonym that designates a particular feature of the participant's security information can be utilized by a threat exchange server to compare similar non-encoded information (e.g., information that is not encoded with a pseudonym, etc.) from the number of participants within the threat exchange community. For example, if a first participant submits security information relating to a "Server 1", it can be compared to security information from a second participant relating to a "Server A". In this example, the pseudonyms (e.g., Server 1, Server A, etc.) can be generic terms of the hardware relating to the security information. That is, the pseudonyms can be used to categorize features of the security information so that the non-encoded information can be compared based on similar features of an IT infrastructure.

The number of pseudonyms used to encode features of the received security information can be decoded (e.g., decrypted) utilizing a pseudonym table. The pseudonym table can be stored within the participant's IT infrastructure to decode the encoded security information. In addition, the participant can use the pseudonym table to decode any encoded information within the analysis results from the security threat exchange community. The pseudonym table can be accessed only by the participant utilizing the pseudonym table for encoding and decoding security information. The pseudonym table can be shared with other users or entities to give them access to the pseudonym table or a portion of the pseudonym table.

The pseudonym table can include each of the number of pseudonyms with a corresponding feature within the security information. For example, the pseudonym table can include the pseudonym "Server 1" and the corresponding information relating to the server within the participant IT infrastructure. The pseudonym table can include specific information relating to the corresponding information that the pseudonym represents. For example, the pseudonym table can include details (e.g., serial number, model number, make, etc.) of the server corresponding to the pseudonym "Server 1".

The encoding and decoding of security information can be performed by an encryption function. The encryption function can be used exclusively by a particular participant to encode and decode the participant's security information. For example, the encryption function can include an encryption algorithm, wherein the particular participant knows the encryption algorithm key. The participant can use the encryption function to encrypt a portion of the security information prior to sending the security information to the threat exchange community. The participant can receive analysis results from the threat exchange community. The analysis results can include the portion of the security information that is encrypted with the encryption function. The participant can decode and/or decrypt the analysis results to view the security information portion with the corresponding analysis results. The encryption function can be used to encrypt similar and/or the same information as the information encoded with pseudonyms.

The security information can be amended and/or edited to include a particular text string that can be identified by the participant. The particular text string can be used to authenticate the security information after decoding and/or decrypting the portion of the security information. For example, the security information can be amended with a known text string before using an encryption function to encrypt a portion of the security information. In this example, the participant can authenticate analysis results corresponding to the security information by determining if the known text string is present after decrypting the portion of the security information.

The particular text string can be a generic pseudonym that can identify a specific feature of the security information. For example, a generic pseudonym "Web Server" can be used to encode a specific server within a participant's IT infrastructure. In this example, the pseudonym "Web Server" can be an encrypted portion that is known only to the participant. That is, only the participant would be able to decode and/or decrypt the pseudonym "Web Server" to identify the specific server within the participant's IT infrastructure.

The number of pseudonyms can be determined and selected based on a desired level security. For example, a participant can determine a level of security and select pseudonyms for a number of features based on the level of security. In the same example, a participant can determine that a particular level of security is high for hardware features within the participant's IT infrastructure. The participant in this example can select a generic term (e.g., server, computer, personal computer, etc.) for the hardware features in order to secure the specifics (e.g., make, model, serial numbers, etc.) of the hardware features.

The level of security and corresponding pseudonym that is selected can affect the amount of security information shared with the threat exchange community. For example, specifics of the hardware features can be relevant to the threat exchange community in determining if particular security information relates to a hardware feature with particular specifics (e.g., make, model, serial number, features, etc.). In this example, a particular model of a server can be experiencing problems that appear as a security threat within the sent security information. Comparing the security information can identify a problem with the particular model server and confirm that there is not a security threat. In some cases, the security threat exchange community may not be able to identify that there is a defect of a particular model of server without receiving the specifics from a number of participants.

At box 224 the method 220 can include analyzing the security information collectively from the number of participants, wherein the portion of the received threat information remains encoded. Analyzing the security information can include a threat exchange server (e.g., threat exchange server 104 as described in FIG. 1, etc.) categorizing the pseudonyms into a number of categories to analyze non-encoded information relating to the pseudonyms within each category. For example, the security information can be analyzed based on a category of the relating pseudonym. In this example, the pseudonyms "Server 1" from a first participant and "Server A" from a second participant can be placed into a particular category and the security information relating to each pseudonym can be analyzed.

Analyzing the security information can include comparing similar non-encoded information between each of the number of participants. For example, the similar non-encoded information can include security information collected within a predetermined time period (e.g., day, week, etc.). In another example, the similar non-encoded information can include analyzing similar security attacks within the security information between multiple participants.

Analyzing the security information can include comparing the security information relating to particular features of the number of participants' IT infrastructure. For example, the security information can be analyzed together if the security information is logged on a personal computing device. In another example, the security information can be analyzed together if the security information is logged on a system server. In these examples, the threat exchange community can determine the particular feature corresponding to the pseudonym.

At box 226 the method 220 can include sending, via the communication link, analysis results to each of the number of participants, wherein the analysis results includes information relating to the portion (e.g., portion of information encoded with a pseudonym, etc.). The analysis results can be sent from the threat exchange server include a security threat type (e.g., virus, security attack, etc.), a security threat level (e.g., high, low, etc.), a frequency among participants (e.g., number of participants affected within an entity, etc.), etc. The analysis results can be sent to each of the number of participants.

The analysis results can correspond to the security information received from each participant. For example, if a particular participant sends security information to the threat exchange community, the analysis results can correspond to the security information sent by the particular participant. In this same example, the analysis results may be sent only to the particular participant and not to other participants within the threat exchange community. That is, the analysis results can be sent exclusively to the participant that sent corresponding security information.

The analysis results can include a request for additional security information for a particular number of participants. The request for additional security information can include requesting specifics of security information encoded by pseudonyms. The request for additional security information can include a request for further specifics of hardware features and/or software features. For example, if the received security information includes a high level of security and utilizes generic terms for a participant's hardware, a request for a make and model of the hardware can be requested to determine if there is a common issue (e.g., failure, malfunction, etc.) with particular hardware that is utilized by a number of participants within the threat exchange community.

The request for further specifics of hardware features can include a request for identifiable features and/or identifiable numbers of the hardware (e.g., manufacturer name, year of production, serial number, model number, etc.). The identifiable features and/or identifiable numbers of the hardware can enable the threat exchange server to identify the hardware. In addition, the request for further specifics of software features can include a request for identifiable features of the software (e.g., version, patch level, manufacturer, license number, vendor, etc.).

The participant can determine whether or not to provide the information to the threat exchange community (e.g., threat exchange server, etc.). If the information is provided to the threat exchange community, the threat exchange server can re-evaluate the submitted security information considering the additional hardware and/or software features. Considering the hardware and/or software features can provide more accurate analysis results. For example, the threat exchange server can identify a security threat that is occurring only within IT infrastructures operating a particular software version and send an alert with analysis results to participants utilizing the particular software version.

Figure 3:
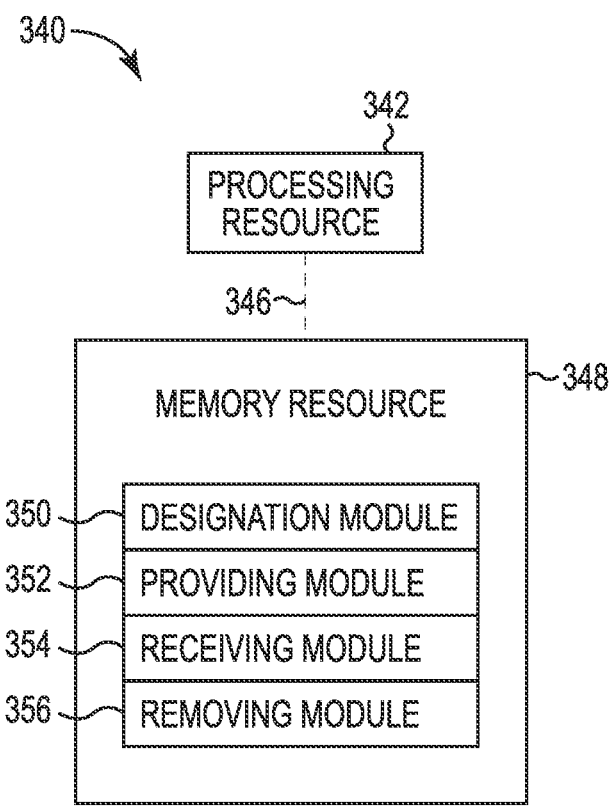
FIG. 3 illustrates a block diagram of an example of a system according to the present disclosure.

FIG. 3 illustrates a block diagram of an example of a system 340 according to the present disclosure. The system 340 can utilize software, hardware, firmware, and/or logic to perform a number of functions.

The system 340 can be any combination of hardware and program instructions configured to share information. The hardware, for example can include a processing resource 342 and/or a memory resource 348 (e.g., computer-readable medium (CRM), machine readable medium (MRM), database, etc.) A processing resource 342, as used herein, can include any number of processors capable of executing instructions stored by a memory resource 348. Processing resource 342 may be integrated in a single device or distributed across multiple devices. The program instructions (e.g., computer-readable instructions (CRI)) can include instructions stored on the memory resource 348 and executable by the processing resource 342 to implement a desired function (e.g., sharing security context information).

The memory resource 348 can be in communication with a processing resource 342. A memory resource 348, as used herein, can include any number of memory components capable of storing instructions that can be executed by processing resource 342. Such memory resource 348 can be a non-transitory CRM. Memory resource 348 may be integrated in a single device or distributed across multiple devices. Further, memory resource 348 may be fully or partially integrated in the same device as processing resource 342 or it may be separate but accessible to that device and processing resource 342. Thus, it is noted that the system 340 may be implemented on a user and/or a participant device, on a server device and/or a collection of server devices, and/or on a combination of the user device and the server device and/or devices.

The processing resource 342 can be in communication with a memory resource 348 storing a set of CRI executable by the processing resource 342, as described herein. The CRI can also be stored in remote memory managed by a server and represent an installation package that can be downloaded, installed, and executed. The system 340 can include memory resource 348, and the processing resource 342 can be coupled to the memory resource 348.

Processing resource 342 can execute CRI that can be stored on an internal or external memory resource 348. The processing resource 342 can execute CRI to perform various functions, including the functions described with respect to FIGS. 1 and 2. For example, the processing resource 342 can execute CRI to send security information to a threat exchange community and/or encode pseudonyms for a number of features based on a level of security.

A number of modules 350, 352, 354, 356, can include CRI that when executed by the processing resource 342 can perform a number of functions. The number of modules 350, 352, 354, 356 can be sub-modules of other modules. For example, the designation module 350 and the providing module 352 can be sub-modules and/or contained within the same computing device. In another example, the number of modules 350, 352, 354, 356 can comprise individual modules at separate and distinct locations (e.g., CRM, etc.).

A designation module 350 can include CRI that when executed by the processing resource 342 can designate a randomly selected pseudonym to encode IT infrastructure information for a participant of a threat exchange community. As described herein the designation module 350 can randomly select a number of pseudonyms to designate and encode IT infrastructure information so the pseudonym corresponds to a particular feature of the IT infrastructure. For example, the designation module 350 can select a descriptive term that is generic to the particular feature of the IT infrastructure to provide the threat exchange community with a brief description of the particular feature. The designation module 350 can designate the pseudonym based on a determined level of security for a particular feature. For example, a participant can designate a level of security for a feature and/or an architecture, then the designation module 350 can designate a type of pseudonym for each feature based on the level of security.

A providing module 352 can include CRI that when executed by the processing resource 342 can provide security information collected within to the threat exchange community, wherein the security information is sent with the designated pseudonyms. The providing module 352 can provide the security information collected from the number of participants to a threat exchange server. The providing module 352 can also categorize the security information prior to sending the security information to the threat exchange server.

A receiving module 354 can include CRI that when executed by the processing resources 342 can receive IT infrastructure analysis results from the threat exchange community, wherein the IT infrastructure analysis results include the designated pseudonyms. The receiving module 354 can receive the analysis results via a communication path. The receiving module 354 can also send the analysis results to a removing module 356.

The removing module 356 can include CRI that when executed by the processing resource 342 can remove the designated pseudonyms from the information using the pseudonym table to determine the IT infrastructure analysis for the corresponding IT infrastructure information. The removing module 356 can use a pseudonym table to replace the pseudonyms within the analysis results with specifics of the corresponding pseudonyms. Removing (e.g., decoding, etc.) the pseudonyms can reveal to a participant a significance of the analysis results for each feature of information encoded with pseudonyms.

A memory resource 348, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The memory resource 348 can be integral, or communicatively coupled, to a computing device, in a wired and/or a wireless manner. For example, the memory resource 348 can be an internal memory, a portable memory, a portable disk, or a memory associated with another computing resource (e.g., enabling CRIs to be transferred and/or executed across a network such as the Internet).

The memory resource 348 can be in communication with the processing resource 342 via a communication link (e.g., path) 346. The communication link 346 can be local or remote to a machine (e.g., a computing device) associated with the processing resource 342. Examples of a local communication link 346 can include an electronic bus internal to a machine (e.g., a computing device) where the memory resource 348 is one of volatile, non-volatile, fixed, and/or removable storage medium in communication with the processing resource 342 via the electronic bus.

The communication link 346 can be such that the memory resource 348 is remote from the processing resource (e.g., 342), such as in a network connection between the memory resource 348 and the processing resource (e.g., 342). That is, the communication link 346 can be a network connection. Examples of such a network connection can include a local area network (LAN), wide area network (WAN), personal area network (PAN), and the Internet, among others. In such examples, the memory resource 348 can be associated with a first computing device and the processing resource 342 can be associated with a second computing device (e.g., a Java® server). For example, a processing resource 342 can be in communication with a memory resource 348, wherein the memory resource 348 includes a set of instructions and wherein the processing resource 342 is designed to carry out the set of instructions.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for threat exchange information protection, comprising:
   receiving, via a communication link, security information from a number of participants of a threat exchange community, wherein a portion of the received security information is encoded with pseudonyms by each of the number of participants;
   determining a functionality of network devices that are associated with the received security information encoded with a pseudonym;
   analyzing the security information collectively from the number of participants, wherein the portion of the received security information remains encoded, and wherein analyzing the security information includes comparing security information from the number of participants based on the functionality of network devices that are associated with the received security information; and
   sending, via the communication link, analysis results to each of the number of participants, wherein the analysis results sent to each of the number of participants include information relating to the portion encoded with a pseudonym by that participant.

2. The method of claim 1, comprising sending a request for additional security information to a particular participant of the threat exchange program.

3. The method of claim 1, wherein analyzing the security information includes categorizing the pseudonyms into a number of categories to analyze non-encoded information relating to the pseudonyms within each category.

4. The method of claim 1, wherein analyzing the security information includes comparing similar non-encoded information between each of the number of participants.

5. The method of claim 1, wherein the pseudonyms designate a feature of non-encoded information.

6. The method of claim 1, wherein sending the analysis results includes sending only analysis results to a particular participant that corresponds to security information received from the particular participant.

7. A non-transitory computer-readable medium storing a set of instructions executable by a processor to cause a computer to:
   designate a pseudonym for each of a number of features within an information technology (IT) infrastructure;
   determine a functionality of each of the number of features based on the designated pseudonym;
   provide security information to a threat exchange community for the number of features;
   receive IT infrastructure analysis results from the threat exchange community, wherein the IT infrastructure analysis results include the pseudonyms for each of the number of features, and wherein the pseudonyms can be decoded by a number of authorized users of the threat exchange community utilizing a pseudonym table; and
   determine individual feature analysis results for each of the number of features using the pseudonym table.

8. The medium of claim 7, wherein the pseudonym table includes the pseudonym and corresponding feature within the IT infrastructure.

9. The medium of claim 7, wherein the pseudonym table is shared with a portion of participants within the threat exchange community.

10. The medium of claim 7, wherein the IT infrastructure analysis includes information that corresponds to of features of a different participant within the threat exchange community.

11. The medium of claim 10, wherein the features of the different participant includes a different pseudonym that corresponds to a different pseudonym table.

12. A system for threat exchange information protection, the system comprising a processing resource in communication with a non-transitory computer readable medium, wherein the non-transitory computer readable medium includes a set of instructions and wherein the processing resource is designed to carry out the set of instructions to:
   designate a randomly selected pseudonym to encode information technology (IT) infrastructure information for a participant of a threat exchange community;
   generate a pseudonym table for the participant;
   provide security information collected within to the threat exchange community, wherein the security information is sent with the designated pseudonyms;
   determine a functionality of network devices that are associated with the received IT infrastructure information encoded with a pseudonym;
   receive IT infrastructure analysis results from the threat exchange community, wherein the IT infrastructure analysis results include the designated pseudonyms, and wherein the pseudonyms can be decoded by a number of authorized users of the threat exchange community utilizing a pseudonym table; and
   remove the designated pseudonyms from the information using the pseudonym table to determine the IT infrastructure analysis for the corresponding IT infrastructure information.

13. The computing system of claim 12, wherein the pseudonym is a generic term describing the IT infrastructure information.

14. The computing system of claim 13, wherein the pseudonym is used to designate a group of similar features for comparison within the threat exchange community.

15. The computing system of claim 12, wherein the pseudonyms are selected based on a desired level of security.

* * * * *